United States Patent [19]
McGee et al.

[11] Patent Number: 5,373,221
[45] Date of Patent: Dec. 13, 1994

[54] METHOD AND SYSTEM FOR ESTIMATING ROBOT TOOL CENTER POINT SPEED

[75] Inventors: H. Dean McGee, Rochester Hills; David W. Osborn, Davisburg; John D. Butkiewicz, Auburn Hills, all of Mich.

[73] Assignee: Fanuc Robotics North America, Inc., Auburn Hills, Mich.

[21] Appl. No.: 99,729

[22] Filed: Jul. 30, 1993

[51] Int. Cl.⁵ .......................... G05B 19/42; B25J 9/10; B25J 9/22
[52] U.S. Cl. .......................... 318/568.11; 318/568.13; 318/568.19
[58] Field of Search .................. 318/560–646; 364/474.01–474.34; 395/88–98

[56] References Cited

U.S. PATENT DOCUMENTS

| | | | |
|---|---|---|---|
| 4,338,672 | 7/1982 | Perzley et al. | 364/513 |
| 4,528,632 | 7/1985 | Nio et al. | 364/169 |
| 4,529,921 | 7/1985 | Moribe | 318/568 |
| 4,598,380 | 7/1986 | Holmes et al. | 364/513 |
| 4,603,286 | 7/1986 | Sakano | 318/615 |
| 4,623,971 | 11/1986 | Ailman et al. | 364/513 |
| 4,689,756 | 8/1987 | Koyama et al. | 364/513 |
| 4,728,872 | 3/1988 | Kishi et al. | 318/568 |
| 4,734,866 | 3/1988 | Bartelt et al. | 364/513 |
| 4,922,852 | 5/1990 | Price . | |
| 4,947,336 | 8/1990 | Froyd . | |
| 4,979,127 | 12/1990 | Mizuno et al. | 364/513 |
| 4,990,743 | 2/1991 | Kugai et al. | 219/124.34 |
| 5,049,796 | 9/1991 | Seraji . | |
| 5,182,056 | 1/1993 | Spence et al. | 264/22 |
| 5,194,792 | 3/1993 | Hara | 318/568.13 |

*Primary Examiner*—Paul Ip
*Attorney, Agent, or Firm*—Brooks & Kushman

[57] ABSTRACT

A method and system is disclosed for estimating a speed of a robot tool center point at a specified time. The method includes the step of receiving an input signal representing the specified time for which the speed estimate is desired. The method also includes the step of processing individual motion segment data to create a blended Cartesian velocity vector. The individual motion segment data represents at least one robot motion segment. The method finally includes the step of transmitting an output signal based on a scalar magnitude of the blended Cartesian velocity vector. The output signal represents the speed of the robot Tool Center Point at the specified time.

20 Claims, 6 Drawing Sheets

METHOD AND SYSTEM FOR ESTIMATING ROBOT TOOL CENTER POINT SPEED

CROSS REFERENCE TO RELATED APPLICATION

This application relates to an application entitled "Method And System For Path Planning In Cartesian Space" filed on the same day as this application, having the same assignee and which is hereby expressly incorporated in its entirety by reference.

TECHNICAL FIELD

This invention relates generally to methods and systems for estimating speed in Cartesian space. In particular, this invention relates to methods and systems using a digital computer for estimating the speed in Cartesian space of a device, such as a robot tool.

BACKGROUND ART

Many process-related robotic applications have dependencies related to the Cartesian speed of a robot Tool Center Point (TCP) due to some process activity which takes place there. Typical examples of process-related robotic applications include painting, welding and sealant dispensing applications.

In the past, control environments based upon the commanded TCP speed value have been used to provide process rate and/or amplitude control. The commanded TPC speed value is the speed which results from processing the programmed TCP speed through the motion control system.

Due to a variety of factors, the actual TCP speed sometimes differs from the commanded speed, often causing undesirable process results. One such undesirable process result might be the dispensing of too much material such as paint or sealant.

Therefore, in order to minimize undesirable process results, attempts have been made to estimate the actual TCP speed. The estimated actual TCP speed could then be used in place of the commanded TCP speed within application control systems.

Some prior art devices, for example the GMFanuc Robotics Corporation R model H controller, have attempted to estimate the TCP speed based upon the scalar acceleration values along linear motion segments.

These attempts met with limited success under the strict requirement that deceleration must be completed before the next linear segment could be started. This requirement, however, is at variance with the actual practice of motion paths which contain smooth and continuous corners between consecutive motion segments, thus dictating that deceleration of the first segment is not complete at the time that the next segment is started.

Other methods have estimated the actual TCP speed based upon computations of the instantaneous TCP velocity. These methods have been based on either forward kinematics or Jacobian transformation. However, they tend to be computationally intensive and can only predict current or immediately following values. They cannot accurately predict the values of the TCP speed for arbitrary times into the future, which in some circumstances is desirable.

A related concern is that in practice, there is always some period of time which the process requires before it can respond to accommodate changes in its control parameters. This response time is referred to as the actuation delay time ("ADT") and can be as short as tens of milliseconds, or as long as hundreds of milliseconds.

Typically, the ADT is of a similar order of magnitude as the acceleration time of the robot. Consequently, using only the instantaneous TCP speed for the TCP speed estimation is not adequate in many instances to avoid undesirable results. For example, in an application following a sharp Cartesian corner with minimal deceleration, the complete deceleration/acceleration period which occurs at the corner could complete before the process could begin to respond to the changing TCP speed control parameter.

Some of the related prior art used single-axis velocity profile analysis to generate feedforward signals for independent axis servo control systems. However, this did not address multi-dimensional analysis and segment blending, nor the use of such control information for application process control. Additional prior art involved using external sensors (e.g. a stationary camera, a tool-mounted flow sensor) to measure and/or calibrate application process flow rate, but failed to consider the use of robot motion data.

Still other prior art used sensor means to monitor the TCP speed relative to a process applicator nozzle in order to adjust process flow rate accordingly. However, this art still is only capable of providing "instantaneous" data, and cannot provide predictions of future TCP motion.

U.S. Pat. No. 4,922,852 to Price discloses an apparatus for dispensing fluid materials. This invention uses a tool speed motion sensor to determine the speed of the tool across the workpiece. The determined speed is then used in feedback to directly adjust the dispensing rate.

U.S. Pat. No. 4,947,336 to Froyd discloses a multiple independent axis motion control system. This invention uses feedforward velocity components to control the velocity of multiple independent actuators. An overall Cartesian speed estimate is not produced as each of the velocity components is handled separately.

U.S. Pat. No. 5,049,796 to Seraji discloses a controller for robotic manipulators. This invention uses a model-based feedforward controller which contains any known part of the manipulator dynamics that can be used for on-line control as a portion of an electrical robotic control system. The method and system of Seraji are limited to control of robot manipulators and fail to consider external process control. In addition, the invention of Seraji does not provide any output signals for such external process control.

In summary, the prior art methods and systems have the following shortcomings:

1) They are computationally intensive.
2) They do not provide accurate speed estimates incorporating variable specified times, in particular the prediction of the TCP speed for arbitrary times into the future.
b 3) They fail to provide the TCP speed information—based upon planned robot motion data—to external application control systems.
4) They often require additional external equipment to generate the application process control signal thus adding cost to the overall robot system.

In view of the prior art, there is a need to develop an efficient and accurate means of providing actual future TCP speed estimates that overcomes the above shortcomings.

SUMMARY OF THE INVENTION

The present invention described and disclosed herein comprises a method and system for estimating a speed of a robot tool center point at a specified time.

It is an object of the present invention to provide a method and system for estimating a speed of a robot tool center point at a specified time wherein method provides the speed estimate based on a variable application delay time.

It is another object of the present invention to provide a method and system for estimating a speed of a robot tool center point at a specified time wherein the speed estimate can be provided as an output from a typical robot control unit to an external application control system.

In carrying out the above objects and other objects of the present invention, a method is provided for estimating a speed of a robot tool center point at a specified time. The method of the present invention includes the step of receiving an input signal representing the specified time.

The method also includes the step of processing motion segment data. The motion segment data represents at least one individual motion segment where a motion segment is the trajectory between two taught positions. The motion segment data is processed based on the specified time to create a blended Cartesian velocity vector.

The method finally includes the step of transmitting an output signal based on the magnitude of the blended Cartesian velocity vector. The output signal represents the speed of the robot tool center point at the specified time.

In further carrying out the above objects and other objects of the present invention, a system is also provided for carrying out the steps of the above described method.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
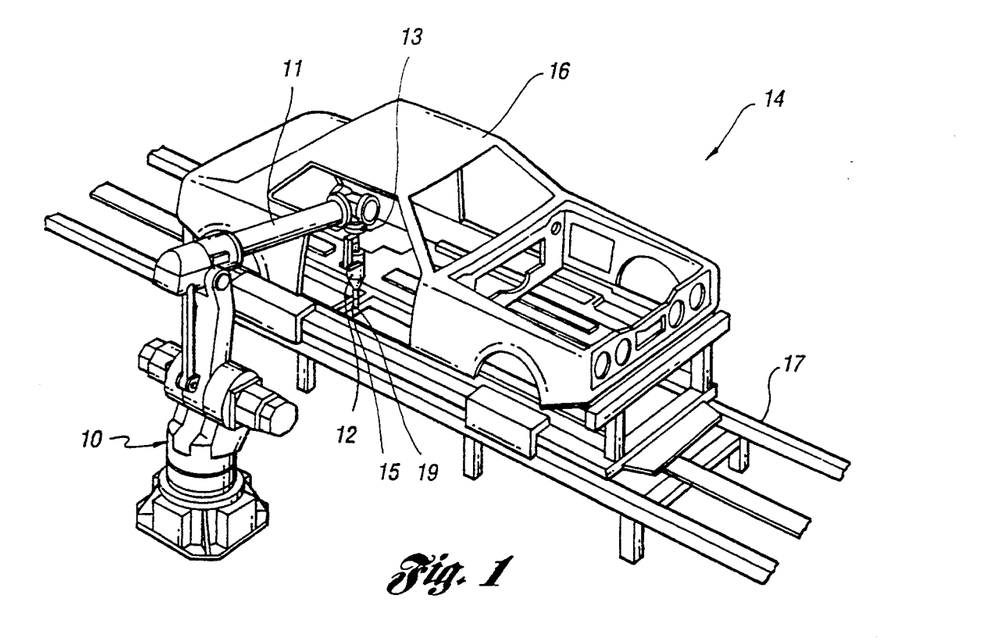
FIG. 1 is a schematic view showing a typical sealing station including an industrial sealing robot.

Referring now to the drawing figures, there is illustrated in FIG. 1 an industrial sealing robot 10 having an arm 11 equipped with a sealant dispenser 12 at a sealing station, generally referred to at 14. A sealant dispenser 12 is attached to the industrial sealing robot 10 at the robot face plate 13. Sealant is dispensed out of the sealant dispenser nozzle 15 at the tool center point 19 which describes the position of sealant application.

A car body 16 is located on a track 17 and the sealant dispenser 12 dispenses sealant on the car body 16 in a controlled fashion. Estimating the speed of the robot tool center point 19 allows the correct amount of sealant to be dispensed on the car body 16, thereby increasing the quality and efficiency of the sealing process.

Figure 2:
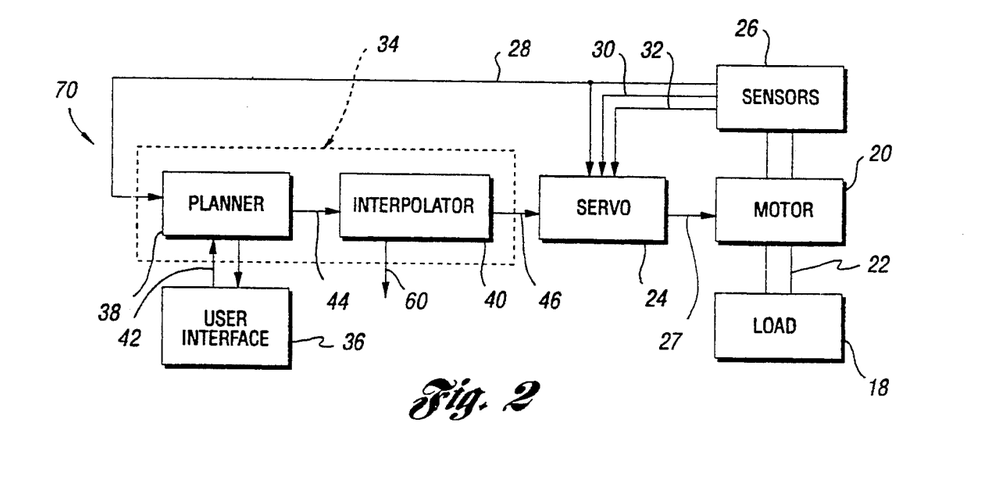
FIG. 2 is a schematic block diagram of a computer-based servo system in accordance with the present invention.

Referring to FIG. 2, the reference numeral 18 schematically designates a positionable member or load of a robot control system generally referred to as 70 according to this invention. The positionable member 18 could take the form of the robot arm 11 and the sealant dispenser 12, as in the illustrated embodiment, or any other position-controlled member. A conventional AC servo motor 20 is rigidly coupled to the positionable member 18 via a shaft 22 and is adapted to be energized by a servo controller 24 for effecting movement of the load 18. The motor 20 is also coupled to one or more sensors 26, including a position feedback sensor such as a resolver or optical encoder, which provides an electrical signal indicative of the motor position on a line 28, motor velocity on a line 30 and motor acceleration on a line 32. Alternatively, one or more of the sensors 26 can be replaced as long as the appropriate position, velocity and acceleration signals are generated.

The reference numeral 34 generally designates a computer-based control unit according to this invention for controlling the output 27 of the servo controller 24 so as to move the load 18. The control unit 34 represents an aggregate of conventional elements, including a central processing unit, a crystal controlled clock, read-only and random access memory, digital and analog input/output ports and D/A and A/D converter channels. The control unit 34 also supports a user interface 36, which may include a teach pendant and/or a video display terminal, to facilitate operator input of commanded positions and system parameters.

The control unit 34 can also be viewed as including a path or trajectory planner 38 and an interpolator 40. The planner 38 receives a correct position of the load 18 on the line 28 and a command or destination position signal on a line 42 from the user interface 36. In turn, the planner 38 outputs trajectory parameters on a line 44 to the interpolator 40. The interpolator 40 takes the trajectory parameters, performs path interpolation and outputs a smoothed velocity command on a line 46 to the servo controller 24.

In general, the planner 38 plans for the velocity inputs to the cascaded filters based on distance, program velocity and corner adjustments specified by the user. Means of adjusting corner rounding distance both globally (affecting the entire robot program) or locally (affecting a particular motion line in a robot program) are provided. The interpolator 40 takes trajectory parameters 44 from the planner 38, runs these through a set of cascaded filters to obtain smooth Cartesian velocity output profiles which are converted into smooth joint velocity commands 46 which are output to the servo controller 24.

In addition, the interpolator 40 can be used to provide an output signal 60 which represents an estimate of the Cartesian speed of the tool center point in accordance with the method and system of the present invention. The speed estimate can be the basis for generating a process parameter which the controller uses to control the operation of the sealant dispenser 12.

Figure 3:
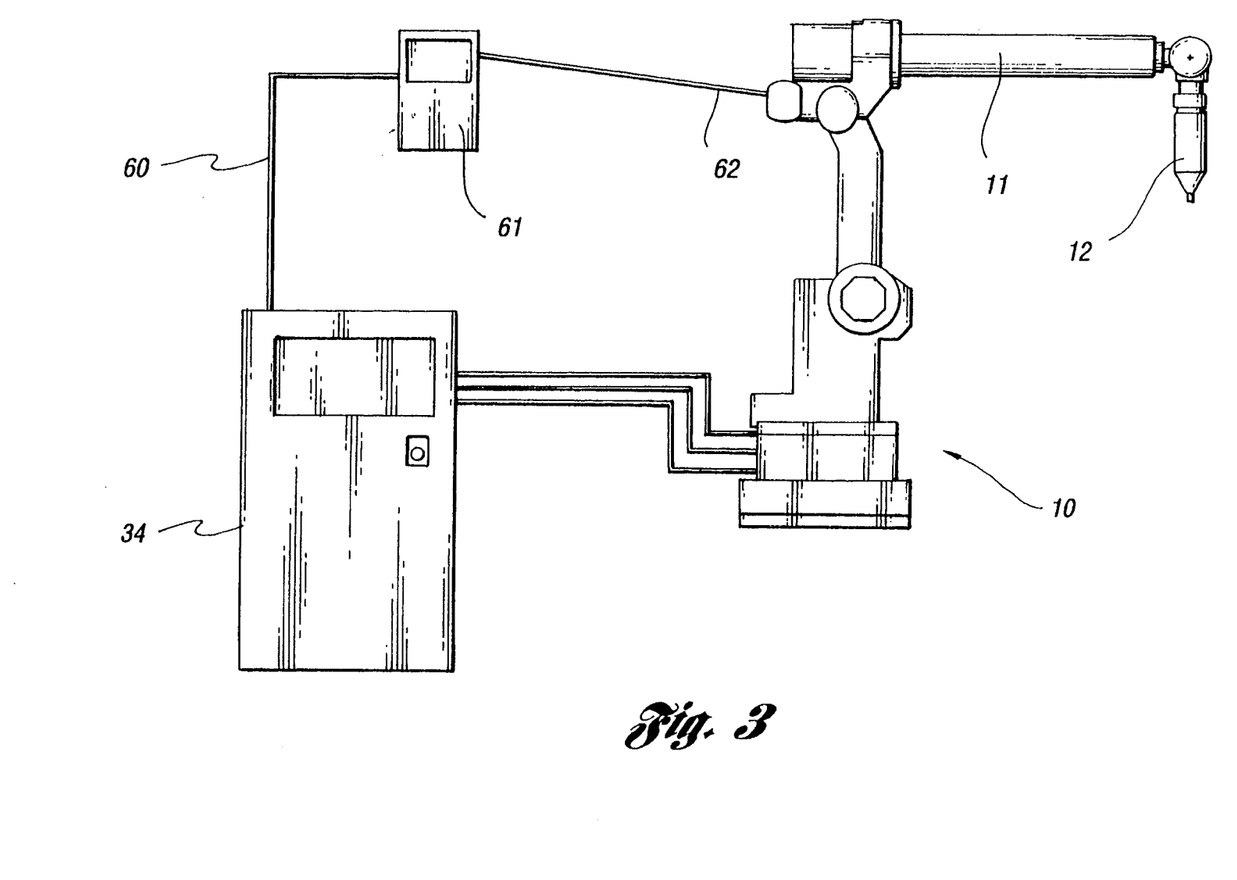
FIG. 3 is a diagram showing a typical sealant dispensing robot and application control system.

FIG. 3 illustrates a typical sealant dispensing robot system consisting of a robot control unit 34, an application process controller 61, which in the case of the example embodiment is a dispensing equipment controller, a robot arm 11, and a sealant dispenser 12. The robot control unit 34 sends an output signal 60 to the application process controller 61, many examples of which are available to those skilled in the art. This in turn generates a flow control signal 62 which controls the flow of material from the sealant dispenser 12.

Figure 4A:
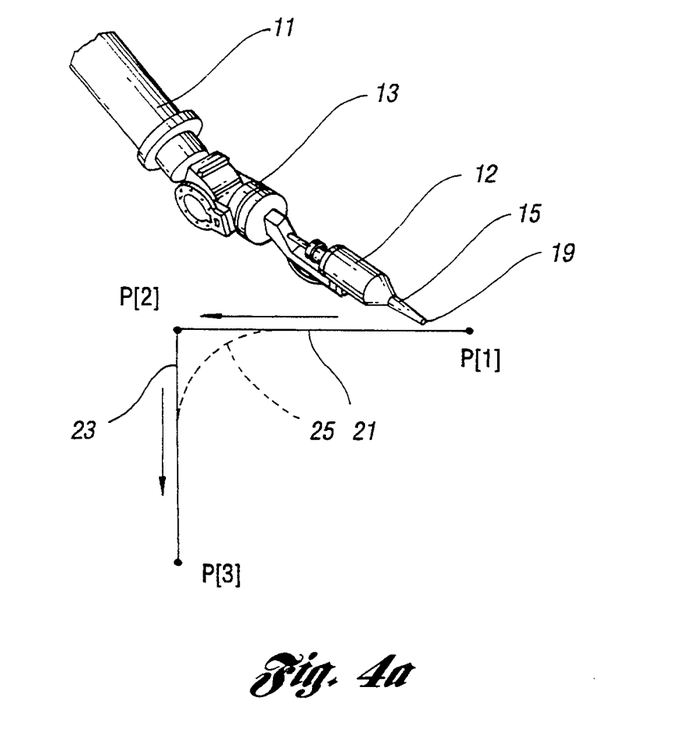
FIG. 4a is a diagram showing the movement of a robot along a programmed path.

FIG. 4a generally illustrates the movement of a robot arm 11 along a typical programmed path having two motion segments 21 and 23. The robot arm 11 is equipped with a sealant dispenser 12 which is attached to the robot face plate 13. Sealant is dispensed through the dispenser nozzle 15 at the tool center point 19 as the robot arm 11 is moved along the actual path trajectory 25.

The motion segment data includes segment endpoint positions, commanded speed values, and acceleration and deceleration information. Data of this type is generated for each of any number of consecutive robot motions and may in fact describe overlapping or blended robot motion segments which represent a programmed robot TCP path or a portion thereof.

In FIG. 4a, the robot arm 11 has been programmed to move along one program path which contains two motion segments 21 and 23. The first motion segment 21 is defined by points P1 and P2, and the second motion segment 23 is defined by points P2 and P3. The actual path trajectory 25 illustrates that the actual motion of the robot arm 11 at the corner of this path, defined as P2, is programmed to be continuous. The robot arm 11, therefore, will not come to a stop directly at P2 prior to moving to P3, but will instead begin moving toward P3 before reaching P2, thus following the arc of the actual path trajectory 25.

Figure 4B:
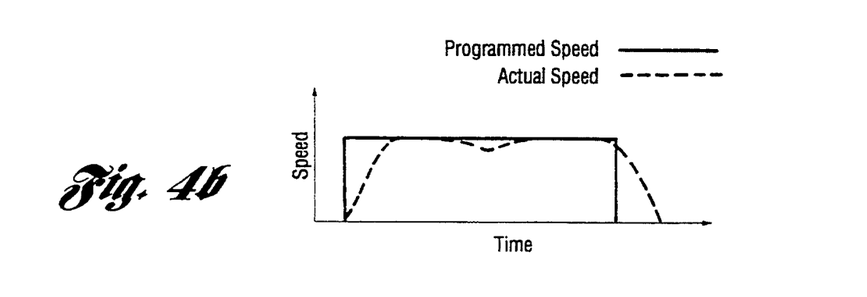
FIG. 4b is a graph of programmed TCP speed and actual TCP speed versus time.

FIG. 4b illustrates the variation between the speed of robot TCP 19 as programmed and the actual speed of robot TCP 19 as it follows the actual path trajectory 25 of the path depicted in FIG. 4a. The programmed speed is represented by the solid line and the actual speed is represented by the dashed line.

As shown in FIG. 4b, the graph of the programmed speed indicates that robot arm 11 attains the programmed speed instantaneously upon beginning to move along the programmed path. This graph further indicates that the programmed speed is maintained constant until the robot arm 11 reaches the end of the programmed path when the robot arm 11 instantaneously decelerates to a stop.

Unlike the programmed speed graph, the actual speed graph reflects the physical constraints of the robot arm 11. The actual speed graph indicates that upon beginning to move along the actual path, the robot arm 11 gradually accelerates to the programmed speed. As the robot arm 11 performs the continuous corner between the two motion segments, the actual speed graph indicates a slight deceleration. After rounding the corner, the actual speed graph shows that robot arm 11 accelerates to resume the programmed speed until reaching the end of the programmed path when the robot arm 11 gradually decelerates to a stop.

The present invention accommodates the process actuation delay times by accurately estimating the TCP speed at any user-specified time, including specified times into the future on the order of typical process actuation delay times where the specified time is the input signal to the robot control system. The ability of the present invention to provide an estimate is only limited by the total duration of all currently queued robot motions provided to the robot controller. The present invention can accurately estimate the TCP speed at any user-specified time in the past as well.

This invention achieves its accuracy and reliability by basing the estimate on the corresponding actual robot motion segment data, including the programmed Cartesian velocity and the segment blending (or overlap) information. The motion segment data is processed using prior art means to determine corresponding velocity profiles which are then summed to generate the blended Cartesian velocity vector.

All such segment data is time-stamped to facilitate blending during times of segment acceleration or deceleration, and to provide an index by which the specified times may be used to accomplish the desired estimation. The magnitude of the resulting blended Cartesian velocity vector is then used as the TCP speed estimate.

Figure 5:
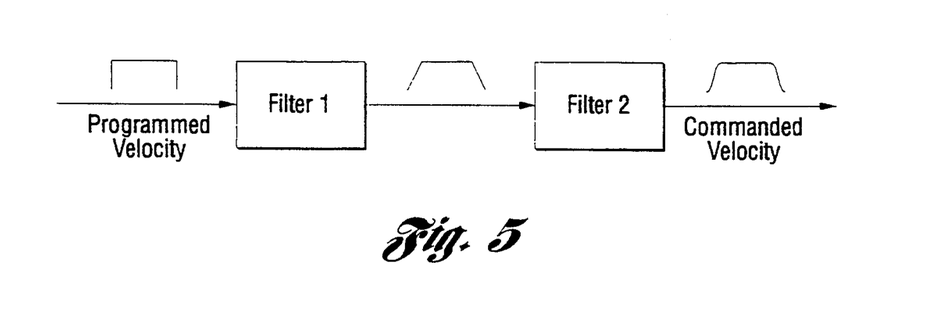
FIG. 5 is a block diagram of a double linear filter with inputs and outputs illustrated graphically.

To accurately describe the acceleration and deceleration of a robot performing a programmed motion segment, the present invention uses a double linear filter illustrated in FIG. 5. Filter 1 uses data describing the programmed velocity profile as input and creates output data describing a velocity profile having three regions: an acceleration region, a constant velocity region and a deceleration region.

The output data created by filter 1 is used as input for filter 2. Filter 2 creates data describing a commanded velocity profile. The commanded velocity profile has seven regions: three regions within each of the acceleration and deceleration areas, plus a constant velocity region.

Figure 6A:
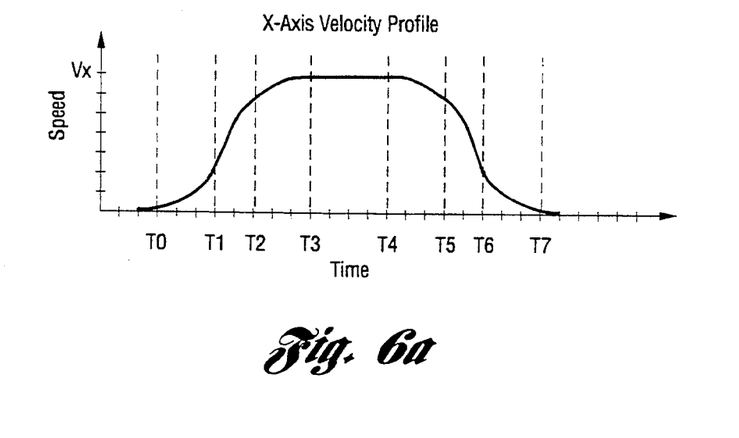
FIG. 6a is a graph of a typical X-axis velocity profile that can be generated using the output of the double linear filter.
Figure 6B:
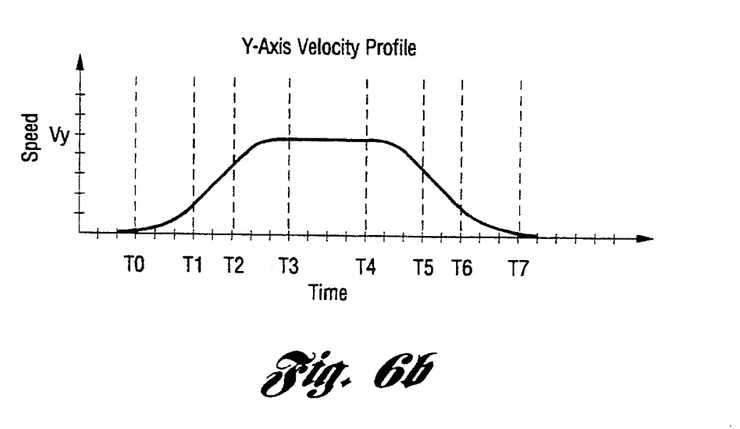
FIG. 6b is a graph of a typical Y-axis velocity profile that can be generated using the output of the double linear filter.
Figure 6C:
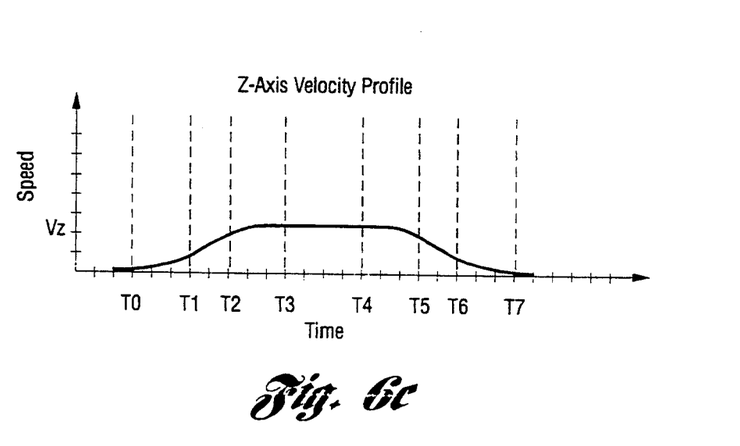
FIG. 6c is a graph of a typical Z-axis velocity profile that can be generated using the output of the double linear filter.

FIGS. 6a–6c show a set of typical commanded velocity profiles which result from the double linear filtering technique illustrated in FIG. 5. $V_x$, $V_y$, and $V_z$ in FIGS. 6a, 6b and 6c, respectively, are the commanded Cartesian velocity components of a typical motion segment, and are shown here to illustrate the acceleration, constant velocity, and deceleration regions of a typical commanded velocity profile. The time values of T0 through T7 within each graph identify the boundaries of these regions.

The commanded velocity profiles of FIGS. 6a–6c, however, are not typically available within a robot motion control system until the time of actual robot motion, which is too late to be used for the purpose of estimating a future TCP speed value. Therefore, the present invention uses the programmed velocity data, which is part of the motion segment data and is available once the motion segment planning begins, and the acceleration/deceleration region timing information, which is also part of the motion segment data, to generate the commanded velocity profile information.

As shown by FIGS. 6a-6c, the time values T0 through T7 of each velocity profile are initially determined as relative offsets to T0. These time values are converted to absolute system time values once each corresponding motion segment has been provided to the robot motion control system.

At that time, a segment start time $T_{ssi}$ is assigned to each segment i, and times T1 through T7 are converted to absolute system times T1' through T7' respectively. This provides the reference means for the estimation time indexing, since it is then known that the actual robot motion associated with segment i will begin at system time $T_{ssi}$.

The estimation time $T_{est}(t)$ used to compute the TCP speed estimate at system time t is derived as:

$$T_{est}(t) = t + T_{st}$$

where t is the current absolute system time, and $T_{st}$ is the user specified time which is typically the application process delay time. Thus, for any system time t, the values of the estimation time $T_{est}$ and segment start times $T_{ssi}$ can be used to determine a time index along each motion segment velocity profile.

A scale factor $s_i(t)$ is then computed for each motion segment i at time t as a percentage of the segment's corresponding programmed velocity $V_{pi}$ as:

$$s_i(t) = f(t,i)$$

where f(t,i) is a function of the current system time t and the acceleration region data T0-T7 for segment i such that the scaled velocity Vi(t) for segment i at system time t can be computed as:

$$V_i(t) = s_i(t) * V_{pi}$$

where the scaled velocity Vi(t) represents the estimated value of the commanded velocity vector value $V_{ci}(t)$ for segment i at system time t.

Values of $s_i(t)$ will thus increase from 0.0 during each segment's acceleration region, the region bounded by time indices T0 and T3. Within the constant velocity region, the region bounded by time indices T3 and T4, the value of $s_i(t)$ equals 1.0 noting that there may exist some motions during which constant velocity is not reached. Values of $s_i(t)$ will decrease once again to 0.0 during each segment's deceleration region, the region bounded by time indices T4 and T7.

Figure 7A:
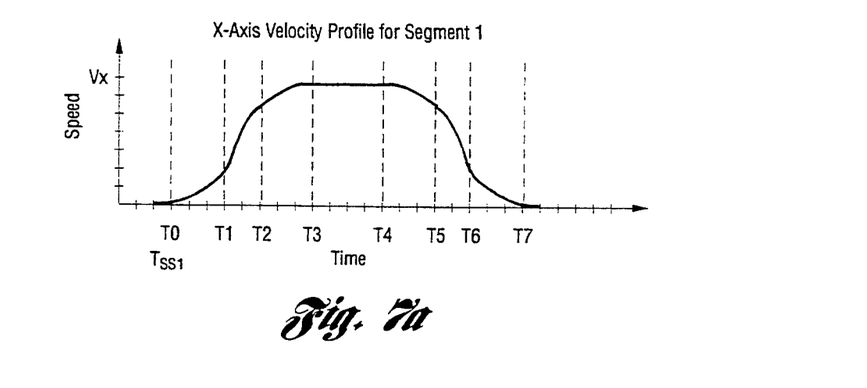
FIG. 7a is a graph of a typical X-axis velocity profile for a first motion segment.
Figure 7B:
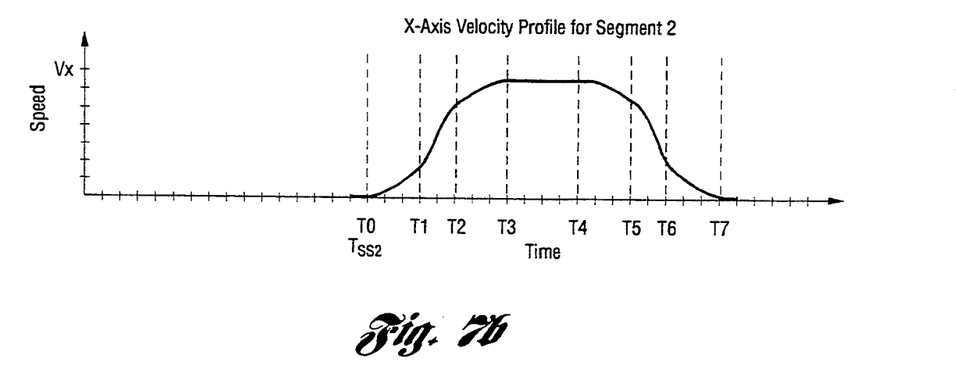
FIG. 7b is a graph of a typical X-axis velocity profile for a second motion segment.
Figure 7C:
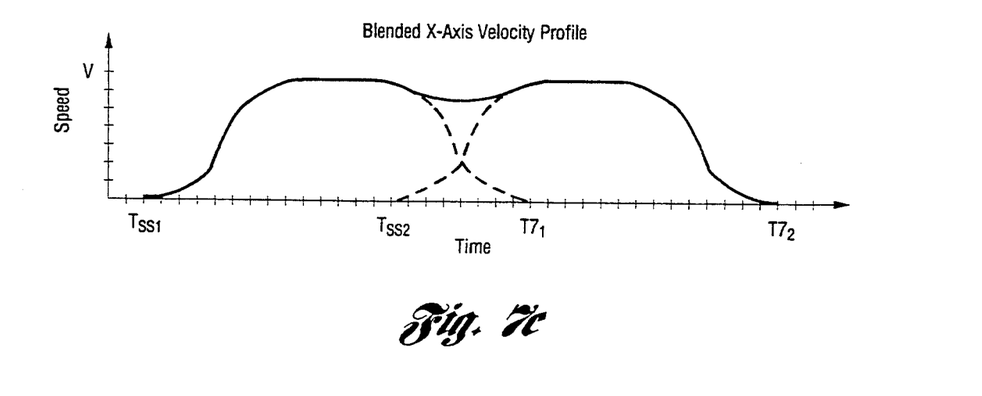
FIG. 7c is a graph of a blended X-axis velocity profile that can be generated by vectorially summing the velocity profiles of FIGS. 7a and 7b.

FIGS. 7a-7c illustrate the blending of the X-axis components of the commanded velocity profiles for two motion segments. FIGS. 7a is a graph of a typical X-axis velocity profile for the first motion segment. FIG. 7b is a graph of a typical X-axis velocity profile for the second motion segment.

FIG. 7c shows that the scaled velocity vectors $V_i(t)$ of FIGS. 7a and 7b as representative example motion segments i=1 and 2 over a range of system times $t = T_{ss1}$ to $t = T7_2$ are vectorially summed, in other words blended, to generate a blended Cartesian velocity vector V(t) as:

$$V(t) = \sum_i V_i(t)$$

This example can of course be extrapolated to include velocity vectors $V_i(t)$ for all motion segments i which have non-zero velocity values for each system time t.

The TCP speed estimate Spd(t) for system time t is then computed as the magnitude of the blended Cartesian velocity vector V(t):

$$Spd(t) = |V(T_{est}(t))|$$

evaluated for time $T_{est}(t)$ which in the case of a speed prediction will be slightly ahead of the system time t, as computed earlier, thus achieving the desired prediction.

Figure 8A:
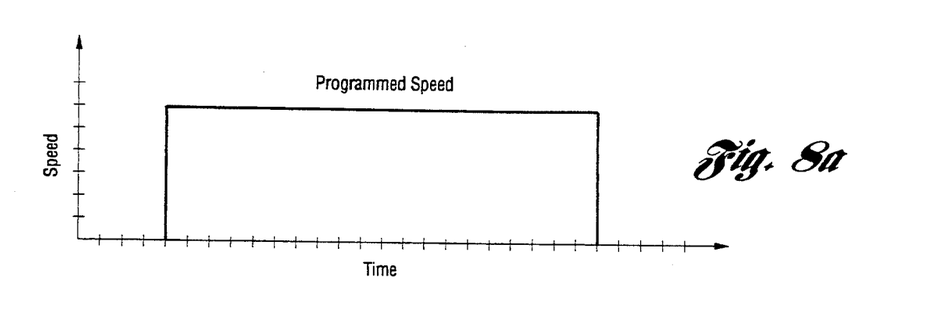
FIG. 8a is a graph of the programmed velocity profile for a using robot the present invention.
Figure 8B:
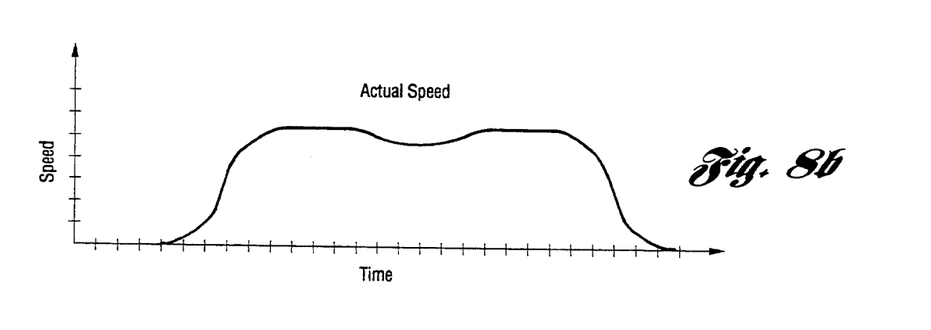
FIG. 8b is a graph of the actual velocity profile for a robot using the present invention.
Figure 8C:
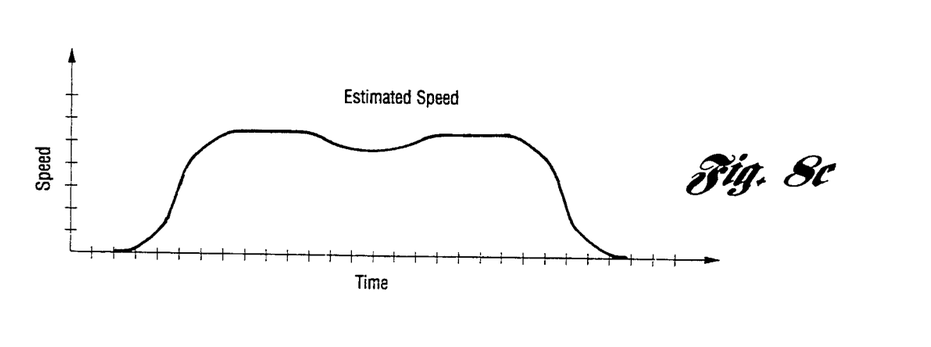
FIG. 8c is a graph of the estimated velocity profile for a robot using the present invention.

FIGS. 8a-8c show the relationship between the corresponding programmed, actual, and estimated TCP speed profiles. The value of $T_{st}$ used in FIG. 8C is positive. A positive value of $T_{st}$ indicates the estimated TCP speed represents a prediction of future TCP speed. A zero value of specified time $T_{st}$ indicates the estimated TCP speed represents the current actual TCP speed, and a negative value of $T_{st}$ indicates the estimated TCP speed represents a historical value of the TCP speed.

The present invention, therefore, uses the concept of determining the amount of Cartesian axis acceleration in effect at any given time as a percentage of command velocity for each motion segment for the desired time. The vector sum of these scaled Cartesian velocities is the estimated robot Cartesian velocity. The magnitude of this vector is the TCP speed estimate, depicted as line 60 of FIG. 2.

The preferred embodiment of the present invention generates a process parameter or output signal which is based upon and is proportional to the estimated TCP speed estimate value through on-line processing of real-time motion data. The method uses a positive value of $T_{st}$ which is equal to the equipment delay time of application processing equipment being used. The resulting TCP speed parameter is then used as a control input for the application process control system. In the case of a dispensing application, the dispensing flow rate can then be adjusted to compensate for estimated future changes of the TCP speed.

Other embodiments of this invention include on-line processing of historical motion data to generate the TCP estimates, off-line processing of motion data which results from pre-processing robot program information.

What is claimed is:

1. In a system including a robot controller and a robot tool center point speed estimator, a method for estimating a speed of a robot tool center point at a specified time, the method including the steps of:

receiving at the robot tool center point speed estimator an input signal representing the specified time;

processing at the robot tool center point speed estimator individual motion segment data representing at least one motion segment based on the specified time to compute a blended Cartesian velocity vector, the blended Cartesian velocity vector approximating actual robot tool center point Cartesian velocity at the specified time;

transmitting from the robot tool center point speed estimator an output signal based on a magnitude of the blended Cartesian velocity vector, wherein the output signal represents the speed of the robot tool center point at the specified time; and calculating a control parameter based on the output signal, wherein the control parameter generally relates to rate control of a process located at the robot tool center point.

2. The method of claim 1 wherein the step of processing includes the step of computing segment Cartesian velocity profile data associated with the specified time based on the individual motion segment data, the individual motion segment data including programmed velocity data and acceleration/deceleration region timing information.

3. The method of claim 2 wherein the step of computing segment Cartesian velocity profile data includes the step of retrieving the individual motion segment data from a memory.

4. The method of claim 2 wherein the step of processing further includes determining a command velocity associated with each motion segment.

5. The method of claim 4 wherein the command velocity is a function of a programmed velocity.

6. The method of claim 4 wherein the step of processing further includes calculating at least one scalar value corresponding to the specified time based on the segment Cartesian velocity profile data.

7. The method of claim 6 wherein the at least one scalar value is computed as a percentage of the associated command velocity.

8. The method of claim 6 wherein the step of processing further includes calculating at least one scaled-velocity vector based on the command velocity and the at least one scalar value.

9. The method of claim 8 wherein the step of processing further includes summing the scaled velocity vectors to calculate a blended Cartesian velocity vector.

10. The method of claim 9 further including the step of calculating a control parameter based on the output signal, wherein the control parameter generally relates to rate control of a process located at the robot tool center point.

11. A system for estimating a speed of a robot tool center point at a specified time, the system including:

means for receiving at a robot tool center point speed estimator an input signal representing the specified time;

means for processing at the robot tool center point speed estimator individual motion segment data representing at least one motion segment based on the specified time to compute a blended Cartesian velocity vector;

means for transmitting from the robot tool center point speed estimator an output signal based on a scala magnitude of the blended Cartesian velocity vector, wherein the output signal represents the speed of the robot tool center point at the specified time; and calculating a control parameter based on the output signal, wherein the control parameter generally relates to rate control of a process located at the robot tool center point.

12. The system of claim 11 wherein the means for processing includes means for computing segment Cartesian velocity profile data associated with the specified time based on the individual motion segment data, the individual motion segment data including programmed velocity data and acceleration/deceleration region timing information.

13. The system of claim 12 wherein the means for computing segment Cartesian velocity profile data includes means for retrieving the individual motion segment data from a memory.

14. The system of claim 12 wherein the means for processing further includes means for determining a command velocity associated with each motion segment.

15. The system of claim 14 wherein the command velocity is a function of a programmed velocity.

16. The system of claim 14 wherein the means for processing further includes means for calculating at least one scalar value corresponding to the specified time based on the segment Cartesian velocity profile data.

17. The system of claim 16 wherein the at least one scalar value is computed as a percentage of the associated command velocity.

18. The system of claim 16 wherein the means for processing further includes means for calculating at least one scaled velocity vector based on the command velocity and the at least one scalar value.

19. The system of claim 18 wherein the means for processing further includes means for summing the scaled velocity vectors to calculate a blended Cartesian velocity vector.

20. The system of claim 19 further including means for calculating a control parameter based on the output signal, wherein the control parameter generally relates to rate control of a process located at the robot tool center point.

* * * * *